United States Patent
Deurwaarder et al.

(10) Patent No.: US 8,700,311 B2
(45) Date of Patent: Apr. 15, 2014

(54) METHOD AND DEVICE FOR MAP SWITCHING

(75) Inventors: William Deurwaarder, Rotterdam (NL); Pieter Geelen, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 1744 days.

(21) Appl. No.: 11/712,578

(22) Filed: Mar. 1, 2007

(65) Prior Publication Data

US 2007/0265774 A1     Nov. 15, 2007

(30) Foreign Application Priority Data

| Mar. 8, 2006 | (GB) | 0604704.7 |
| Mar. 8, 2006 | (GB) | 0604706.2 |
| Mar. 8, 2006 | (GB) | 0604708.8 |
| Mar. 8, 2006 | (GB) | 0604709.6 |
| Mar. 8, 2006 | (GB) | 0604710.4 |

(51) Int. Cl.
*G01C 21/00* (2006.01)

(52) U.S. Cl.
USPC .......................................... 701/409; 340/988

(58) Field of Classification Search
USPC .................... 701/207–213, 408, 409, 414; 340/988–990, 995.1, 995.11–995.19
See application file for complete search history.

(56) References Cited

U.S. PATENT DOCUMENTS

| 4,550,317 | A | 10/1985 | Moriyama et al. |
| 5,315,298 | A | 5/1994 | Morita |
| 5,430,655 | A | 7/1995 | Adachi |
| 5,515,284 | A * | 5/1996 | Abe ............................ 701/202 |
| 5,951,621 | A | 9/1999 | Palalau et al. |
| 6,038,507 | A | 3/2000 | Miyano |
| 6,052,645 | A | 4/2000 | Harada |
| 6,081,609 | A | 6/2000 | Narioka |
| 6,148,090 | A | 11/2000 | Narioka |
| 6,307,485 | B1 | 10/2001 | Hasegawa |
| 6,445,397 | B1 | 9/2002 | Boyer |

(Continued)

FOREIGN PATENT DOCUMENTS

| DE | 10 2004 037233 | 2/2006 |
| EP | 0777206 A | 6/1997 |

(Continued)

OTHER PUBLICATIONS

International Search Report issued on Sep. 24, 2007 for International Application No. PCT/EP2007/002193.

(Continued)

*Primary Examiner* — Dalena Tran

(57) ABSTRACT

A method and navigation device are disclosed which allow for switching the display of map information, depending on the current position and the availability of relatively more detailed map information. In one embodiment, the method includes receiving information of a current position and displaying map information including the current position on a navigation device; determining relative map information coverage for the current position; and switching the displayed map information to display map information of relatively more detailed coverage of the current position, upon determining that map information of relatively more detailed coverage of the current position is displayable. The method may include determining a travel route based upon a travel destination input into a navigation device and determining whether or not, based upon the current position information, travel along the route enters a region wherein the relatively more detailed map information is displayable.

13 Claims, 5 Drawing Sheets

(56) References Cited

U.S. PATENT DOCUMENTS

| | | | |
|---|---|---|---|
| 6,978,209 B2 * | 12/2005 | Nakahara et al. | 701/209 |
| 7,106,218 B2 * | 9/2006 | Kimura | 340/995.1 |
| 7,342,516 B2 * | 3/2008 | Kato et al. | 340/995.19 |

FOREIGN PATENT DOCUMENTS

| | | | |
|---|---|---|---|
| JP | 6195597 A | | 7/1994 |
| JP | 9147295 A | | 6/1997 |
| JP | 11149244 A | | 6/1999 |
| JP | 2000098882 A | | 4/2000 |
| JP | 2004361188 A | | 12/2004 |
| RU | 2233011 | | 7/2004 |

OTHER PUBLICATIONS

International Preliminary Report on Patentability and Written Opinion issued on Sep. 9, 2008 for International Application No. PCT/EP2007/002193.

International Search Report issued Oct. 24, 2007 for International Application No. PCT/EP2007/002184.

\* cited by examiner

METHOD AND DEVICE FOR MAP SWITCHING

CO-PENDING APPLICATIONS

The following applications are being filed concurrently with the present applications. The entire contents of each of the following applications is hereby incorporated herein by reference: A NAVIGATION DEVICE AND METHOD FOR STORING AND UTILIZING A LAST DOCKED LOCATION (Ser. No. 11/712,573) filed on even date herewith; A METHOD AND DEVICE FOR UTILIZING A SELECTABLE LOCATION MARKER FOR RELATIONAL DISPLAY OF POINT OF INTEREST ENTRIES (Ser. No. 11/712,572) filed on even date herewith; A NAVIGATION. DEVICE AND METHOD FOR CONVEYING INFORMATION RELATIONSHIPS (Ser. No. 11/712,563) filed on even date herewith; A NAVIGATION DEVICE AND METHOD OF UPDATING INFORMATION ON A NAVIGATION DEVICE (Ser. No. 11/712,571) filed on even date herewith; A NAVIGATION DEVICE, SERVER, AND METHOD FOR COMMUNICATING THEREBETWEEN (Ser. No. 11/712,603) filed on even date herewith; A METHOD AND DEVICE FOR PROVIDING PREFERENCES DURING ROUTE TRAVEL CALCULATION ON A NAVIGATION DEVICE (Ser. No. 11/712,562) filed on even date herewith; A NAVIGATION DEVICE AND METHOD OF ACTIVATING INFORMATION ON A NAVIGATION DEVICE (Ser. No. 11/712,565) filed on even date herewith; AUTOMATIC DISCOVERY OF WIRELESS COMMUNICATION SETTINGS (Ser. No. 11/713,090) filed on even date herewith; A NAVIGATION DEVICE AND METHOD OF IMPLEMENTING AUDIO FEATURES IN A NAVIGATION DEVICE (Ser. No. 12/736,557) filed on even date herewith; METHODS OF CUSTOMIZING NAVIGATION SYSTEMS (Ser. No. 11/713,089) filed on even date herewith; and A NAVIGATION DEVICE AND METHOD FOR SEQUENTIAL MAP DISPLAY (Ser. No. 11/712,561) filed on even date herewith.

PRIORITY STATEMENT

The present application hereby claims priority under 35 U.S.C. §119 on each of Great Britain Patent Application numbers 0604709.6 filed Mar. 8, 2006; 0604708.8 filed Mar. 8, 2006; 0604710.4 filed Mar. 8, 2006; 0604704.7 filed Mar. 8, 2006; and 0604706.2 filed Mar. 8, 2006, the entire contents of each of which is hereby incorporated herein by reference.

FIELD

The present application generally relates to navigation methods and devices.

BACKGROUND

Navigation systems are known today which utilize Global Positioning System (GPS) technology to determine, through triangulation techniques, precise locations of devices based upon GPS signals received from the satellites.

Based on these GPS signals, navigation devices utilize mapping information to further indicate location and route of travel via display of navigation maps to the user of the navigation devices. These maps are typically stored in a mass storage device connected to or encompassed within a server, wherein the mapping information is transferred from the mass storage device and server, via a communication channel (internet, TCP/IP, etc.) and into a navigation device.

As data can be compressed and as great amounts of data can be stored in small memory devices, map information is typically downloaded from the server and stored on the navigation device of the user, wherein the user has the ability to purchase map information of different locations around the world. Thus, at any one time, the navigation device itself stores the map information needed for a user to travel along a desired route, noting that additional map information for new areas of the country or of the world, for example, can be purchased and downloaded from a server and mass storage device.

As the navigation device itself stores much map information, the navigation device is able to determine, based upon a route selected (including selection of a travel destination for example, noting that the input position can be determined via GPS information) the maps to be displayed to a user of the navigation device based upon the desired travel route. As the user is exiting an area from one map, and entering an area of another map, the navigation device switches the display from one map to another. This is typically done in a known manner based upon the actual position of the navigation device (typically of the navigation device in the user's vehicle) during travel along a desired route (noting that the user may accidentally or intentionally deviate from the route and in such cases, information along the new route or actual route of travel is displayed). Again, maps are switched in a known manner from a display of one to the next.

SUMMARY

In at least one embodiment of the present application, it has been recognized that map information is typically switched in known devices as the user proceeds along the route and is not switched based upon preciseness of map information. Accordingly, in at least one embodiment of the present application, a method is directed to switching display map information to display relatively more detailed map information when available. Such a method, in at least one embodiment, includes: determining a travel route based upon a travel destination input into a navigation device; displaying map information on the navigation device, conveying the determined route; receiving current position information relating to travel along the determined route; determining whether or not, based upon the current position information, travel along the route enters a region wherein relatively more detailed map information is displayable; and switching the displayed map information to display relatively more detailed map information upon determining that travel along the route enters a region wherein the relatively more detailed map information is displayable.

In at least one additional embodiment of the present application, the application is directed to a navigation device. The navigation device includes a processor to determine a travel route based upon a travel destination input into a navigation device; an integrated input and display device to input the travel destination and to display map information conveying the determined route; and a receiver to receive current position information relating to travel along the determined route, the processor being further used to determine whether or not, based upon the current position information, travel along the route enters a region wherein the relatively more detailed map information is displayable and to control the integrated input and display device to switch the displayed map information to a display of relatively more detailed map information, upon the processor determining that travel along the route enters a region wherein the relatively more detailed map information is displayable.

In at least one other embodiment, the present application is directed to another method. The method includes receiving information of a current position and displaying map information including the current position on a navigation device; determining relative map information coverage for the current position; and switching the displayed map information to display map information of relatively more detailed coverage of the current position, upon determining that map information of relatively more detailed coverage of the current position is displayable.

In at least one other embodiment, the present application is directed to another navigation device. The navigation device includes a receiver to receive a current position of the navigation device; an integrated input and display device to display map information including the current position; and a processor to determine relative map information coverage for the current position and to control the integrated input and display device to switch display of the map information to display map information of relatively more detailed coverage of the current position, upon determining that map information of relatively more detailed coverage of the current position is displayable.

In at least one additional embodiment, the present application is directed to another method. The method includes determining a travel route based upon a travel destination input into a navigation device; displaying a map on the navigation device, conveying the determined route; receiving current position information relating to travel along the determined route; determining whether or not the current position information is covered by two or more maps; and displaying the one of the two or more maps covering the current position information in relatively more detail, in place of the previously displayed map, upon determining that the current position information is covered by two or more maps.

In at least one additional embodiment of the present application, the application is directed to a navigation device. The navigation device includes a processor to determine a travel route, based upon a travel destination input into a navigation device; an integrated input and display device to input the travel destination and to display conveying the determined route; and a receiver to receive current position information relating to travel along the determined route, the processor being further used to determine whether or not the current position information is covered by two or more maps and to control the integrated input and display device to display the one of the two or more maps covering the current position information in relatively more detail, in place of the previously displayed map, upon determining that the current position information is covered by two or more maps.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
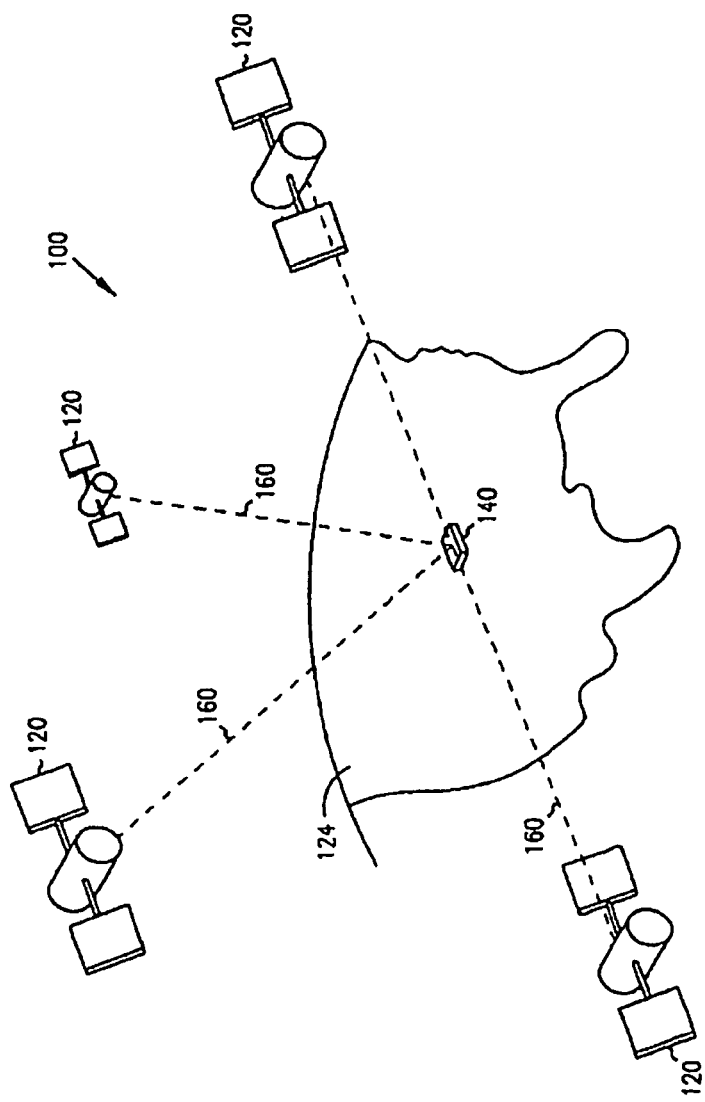
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
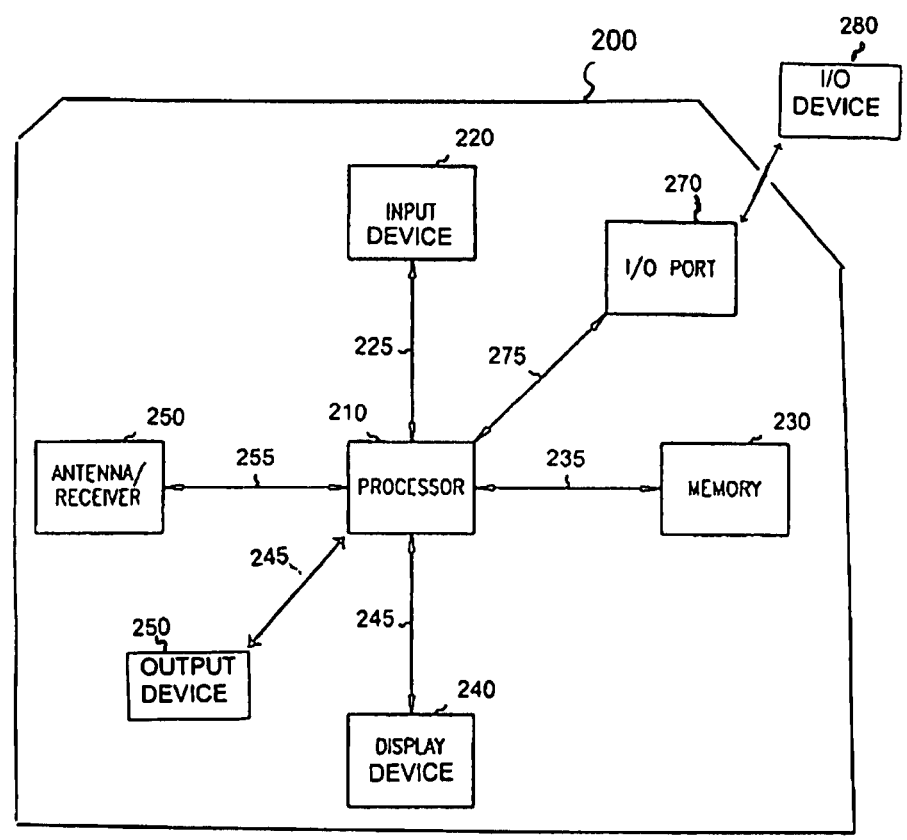
FIG. 2 illustrates an example block diagram of electronic componenets of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a TCP/IP connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
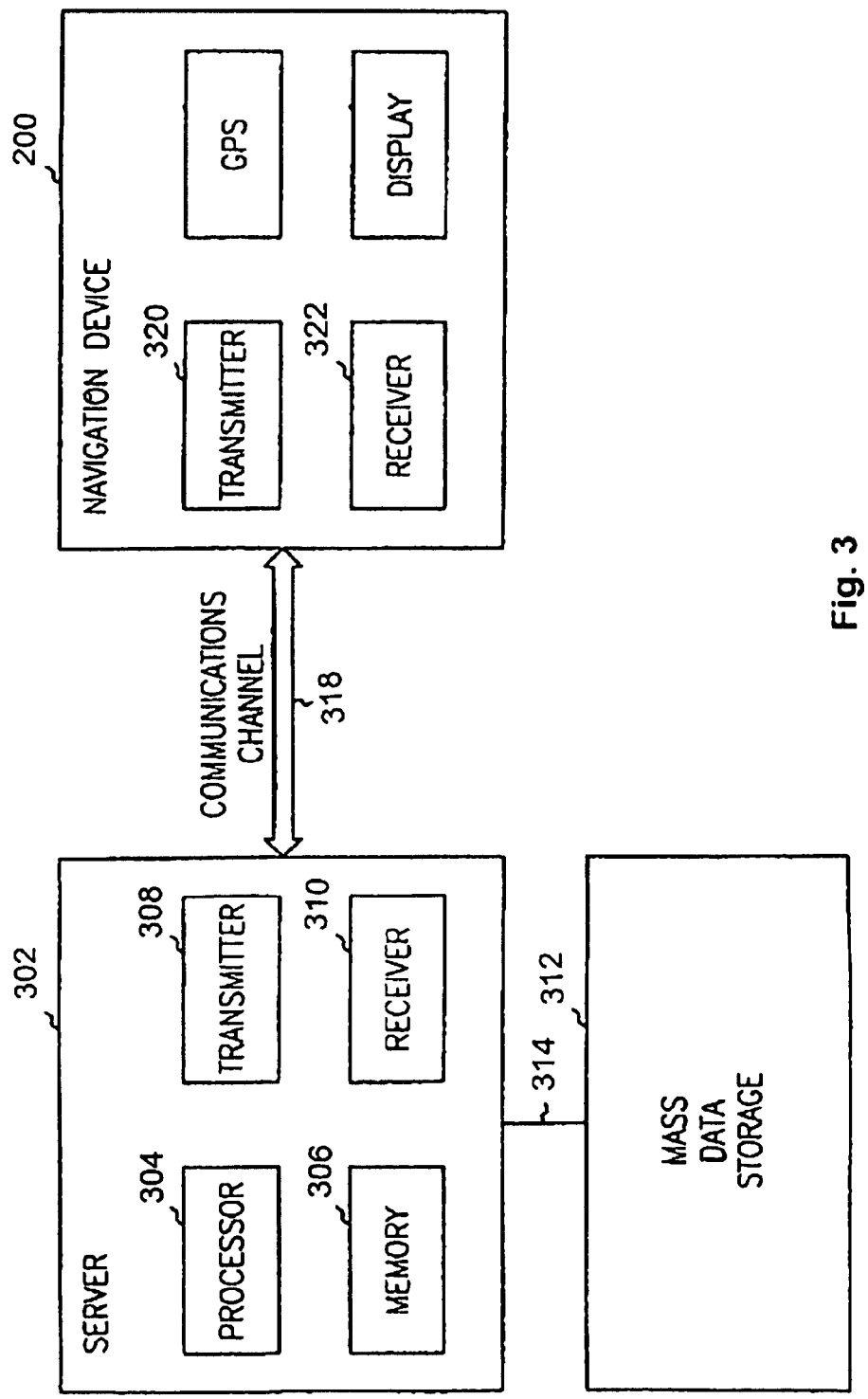
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

In one embodiment, the present application is directed to a map switching method. In such a method, a route of travel is determined based upon a travel destination input into a navigation device 200. The input, via input device 220 of the travel destination may be that of direct input of information, selection of information from one of a plurality of menus, look-up of information based upon an address, etc. Thereafter, the method includes displaying map information on display 240 the navigation device 200, conveying the determined route. Of course, the input device 220 and display device 240 may be integrated, in the form of a touchscreen, for example.

As travel takes place along the determined route, current position information is then received (via receipt of GPS signals via receiver 250 for example). Based upon the current position information, it is determined whether or not travel along the route enters a region where relatively more detailed map information is displayable (e.g. available for display due to storage in memory 230 for example). Upon determining that travel along the route enters a region wherein the relatively more detailed map information is displayable, the displayed map information is switched to display relatively more detailed map information on display device 240.

As such, the navigation device 200 constantly checks its memory 230 for appropriate map information and determines, in conjunction with processor 210, when relatively more detailed map information is displayable, e.g. available to be displayed on display screen 240. When available for display, this more detailed map information is then displayed in place of previously displayed map information, thereby providing the user with more detailed information than before.

The concept of this map switching, in at least one embodiment of the invention, is as follows. First, for any area, there are typically two or more maps stored in memory 230. Each map either covers the whole of an area, such as the United States or a particular state, or a part of that area.

For any point or position/location in the United States or Europe for example, and for any map, a number may be assigned to indicate how well that particular point or position/location is covered on the map. For example, relatively higher numbers can indicate relatively higher coverage and thus relatively more detailed map information covering a particular position/location in relatively more detail, and relatively lower numbers can indicate a relatively less detailed map information covering a particular position/location in relatively less detail.

Although the embodiments of the present application are not so limited, a simple example can include using a zero to indicate no coverage, a one to indicate relatively low detailed coverage or map information, and a two to indicate relatively high detail coverage of a relatively more detailed map information. Typically, at least one map stored in the memory 230 of the navigation device 200 covers all of one area, such as all of Europe or all of the United States for example, in at some level of detail. In at least one embodiment of the present application, at strategic moments when the navigation device 200 determines that a particular current location P, for example, in Europe or the United States is one including relatively higher coverage, it can automatically switch to the map for which current location P has the relatively highest coverage.

Thus, in at least one embodiment, as the user is traveling along the route and as current position information is received for each point P, the processor 210 may determine whether or not relatively more detailed map information is available for display. If available, the display map information can be automatically switched, for example, to display relatively more detailed map information.

In at least one embodiment, each of the determining, displaying, and switching occurs within the navigation device 200 itself, wherein processor 210 receives position information via GPS antenna/receiver 250 for example, determines whether or not relatively more detailed map information is available for display (by comparing stored information regarding map detail coverage in memory 230 for current position point P, for example) and then retrieves the more detailed map information, when available for display, from memory 230 to thereby control a switch of map information display on display screen 240 of the navigation device 200. Thus, both the displayed map information and the relatively more detailed map information are stored in memory 230 within the navigation device 200, for selection by processor 210 of the navigation device 200.

In at least one embodiment, as previously described, the assigned level of detail for the current position P on two or more maps is examined by the processor 210, wherein a zero can indicate no coverage for example, a 1 can indicate relatively low detailed coverage, and a 2 can indicate relatively high detailed coverage for example. Thus, for each position, a level of map detail of the position of the map is assigned. As such, the processor 210 may use the assigned level of detail for the current position information on two or more maps, upon determining that travel along the route enters a region wherein the relatively more detailed map information is displayable, to determine which of the two or more maps includes map information with the relatively more detailed map information.

If there is a tie between several maps, other stored tie breaking rules or other criteria can be used to determine which map is to be displayed in the case of a tie. For example, the tie can be broken in any number of ways including but not limited to: the map including the current position having the highest coverage may be preferred by processor 210 over others, the map currently loaded and displayed on display screen 240 can be preferred over others, the map in which the current travel destination has the highest coverage may be preferred over others, the map in which the points on the current route has the highest coverage may be preferred over others, etc. These and other criteria can be applied individually or in any combination.

Of course, although the method is generally described above, at least one embodiment of the present application also encompasses a navigation device 200 itself. The navigation device 200 includes a processor 210 to determine a travel route based upon a travel destination input into the navigation device 200; an integrated input and display device (encompassing display 240 and input device 220, for example) to input the travel destination and to display map information conveying the determined route; and a receiver 250 to receive current position information relating to travel along the determined route, the processor 210 being further used to determine whether or not, based upon the current position information, travel along the route enters a region wherein the relatively more detailed map information is displayable and to control the integrated input and display device to switch the displayed map information to a display of relatively more detailed map information, upon the processor 210 determining that travel along the route enters a region wherein the relatively more detailed map information is displayable.

In at least one other embodiment, the present application is directed to a method. The method includes receiving information of a current position (from receiver 250 for example) and displaying map information including the current position on a navigation device 200. The method further includes determining, via processor 210 for example, relative map information coverage for the current position, based upon that stored in memory 230 for example. Finally, the method includes switching the displayed map information to display map information of relatively more detailed coverage of the current position, upon determining that map information of relatively more detailed coverage of the current position is displayable (via the processor 210 determining that map information of relatively more detailed coverage of the current position is available in memory 230, for example).

In at least one other embodiment, the present application is directed to another embodiment of the navigation device 200. The navigation device 200 can include a receiver 250 to receive a current position of the navigation device 200; an integrated input and display device (encompassing display 240 and input device 220, for example) to display map information including the current position; and a processor 210 to determine relative map information coverage for the current position and to control the integrated input and display device to switch display of the map information to display map information of relatively more detailed coverage of the current position, upon determining that map information of relatively more detailed coverage of the current position is displayable (via the processor 210 determining that map information of relatively more detailed coverage of the current position is available in memory 230, for example).

In at least one other embodiment, the travel route is determined based upon a travel destination input into the navigation device 200 (wherein the input may include direct input and/or selection of a travel destination for example); displaying a map on the navigation device 200; receiving current position information relating to travel along the determined route; determining whether or not the current position is covered by two or more maps (via processor 210 checking memory 230 for map coverage relating to the current position P for example); and upon determining that the current position information is covered by two or more maps, displaying the one of the two or more maps covering the current position in relatively more detail (again, via processor 210 making this determination based upon stored map criteria, such as stored numerical criteria, categories, etc. for the maps covering the current position, for example).

Again, in these embodiments, positions or points throughout the United States, Europe, etc., can still be assigned a number indicating a relative level of detail, wherein zero can indicate no coverage, 1 can indicate a relatively low detail of coverage, and 2 can indicate a relatively higher detail of coverage for example. Thus, in this embodiment, that previously described above may still apply, including the ability to break ties between several maps.

Further, at least one other embodiment is direct to a navigation device 200 itself. The navigation device 200 of this embodiment includes a processor 210 to determine a travel route, based upon a travel destination input into a navigation device; an integrated input and display device (encompassing input device 220 and display 240 for example) to input the travel destination and to display conveying the determined route; and a receiver 250 to receive current position information relating to travel along the determined route, the processor 210 being further used to determine whether or not the current position information is covered by two or more maps and to control the integrated input and display device to display the one of the two or more maps covering the current position information in relatively more detail, in place of the previously displayed map, upon determining that the current position information is covered by two or more maps.

Additional variance may be applicable to any of the above-described embodiments of the present application. For example, in one ideal situation, all maps may cover the whole of Europe or the whole of the United States in some detail. This would simplify certain decisions and certain algorithms.

It should be noted that more detailed map information can be downloaded/requested from a server 302 if not present in memory 230 of the navigation device. For example, if a user of the navigation device 200 will be traveling to a new area, he/she can connect to the server 302 and can request more detailed map information, wherein the server 302 can send a list of available maps, detail level, etc. Thereafter, once stored, map switching within the embodiments of the application can occur.

Further, the embodiments of the application can be used for more dynamic information, such as traffic and/or road conditions (slipper roads, etc.) which may be sent, received and stored in different levels of detail in a more real-time manner. This can occur via a Bluetooth connection through a mobile phone for example, connecting the navigation device 200 and server 302 in a more real-time manner. Again, different levels of detail of maps can be received, stored and switched as discussed within the embodiments of the application.

Still further, instead of the example of use of a numerical range from zero (no coverage) to 2 (high coverage), larger ranges such as from 0 to 100 (or from 0% to 100% coverage), for example, can be used. The only variant is that larger numbers indicate higher detail.

Even further, a memory efficient and speed efficient way to determine the level of detail of coverage or the availability of relatively more detailed map information of a point or position on a map can include defining two rectangles R1 and R2 for each map. All points within R1 may be defined as "high detail" and all points outside of R1 but inside R2 may be "low detail," with all points outside of R2 having zero coverage. This would simplify the process.

In addition, other low cost alternatives can include using an R1 and R2 which do not enclose each other, wherein R1 and R2 can further be polygons instead of rectangles. Each of these and other permutations and combinations of the concept of the present application are within the scope of the claims of the present application.

EXAMPLES

These are merely examples and the embodiments of the present application are not limited to these examples.

Figure 4A:
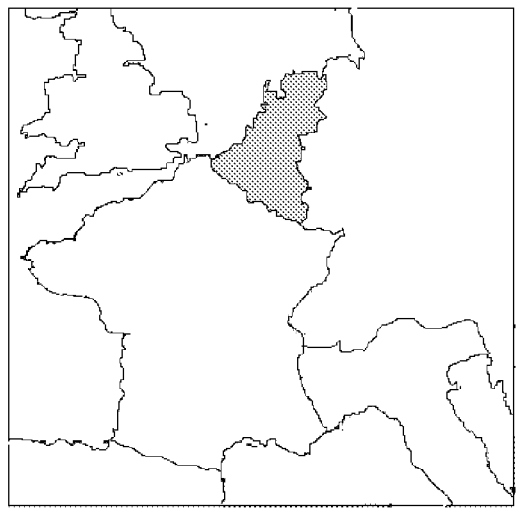
FIGS. 4a and 4b are examples of maps showing high and low detail.
Figure 4B:
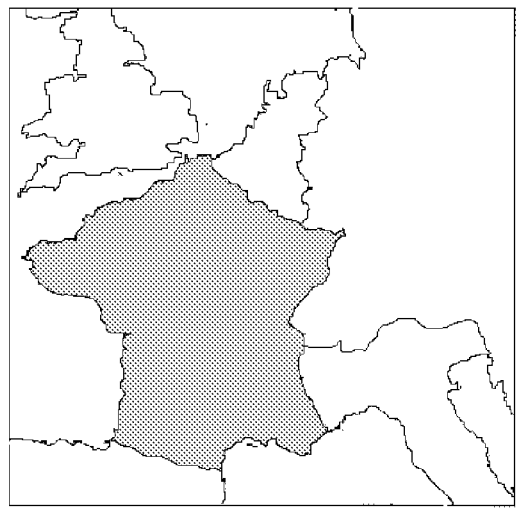

Example 1 is Illustrated in FIGS. 4a and 4b by Two Maps

A navigation device 200 of an embodiment of the present application includes two maps stored in memory 230:
A. covering Benelux in high detail, the rest of Europe in low detail.
B. covering France in high detail, the rest of Europe in low detail.

The navigation device 200 is in Amsterdam and is displaying map A. The user of the navigation device 200 wishes to travel to an address in Paris. The user enters the name PARIS into the navigation device 200.

The processor 210 of the navigation device 200 determines that the selected city PARIS is in a relatively low-detail area of the current map, and further determines that there is also a map, covering PARIS, stored in memory 230 that has this in relatively high detail. The processor 210 of the navigation device 200 can then control display 240 to switch to display of map B.

The user of the navigation device 200 can now select an address in PARIS. The processor 210 of the navigation device 200 now plans a travel route from the current position of the navigation device 200 to the address selected/input. Route planning is done on a map covering the whole of Europe. Since the current map B includes this, the processor 210 of the navigation device 200 can plan a travel route on this map.

The user may now press ENTER to get to the moving map, and start driving. In the moving map, the processor 210 of the navigation device 200 will determine that the user's GPS location is of key relevance, and that another map (map A) has better coverage. It can therefore direct a switching to map A. (The route that was planned on map B can be "transferred" to map A in a manner discussed below).

The user now drives towards Paris for a while. At a certain point, the user will leave the high-coverage area (i.e. he will leave the Benelux). Since his GPS location is of key relevance on the moving map, the processor 210 of the navigation device 200 can direct the display to switch to map B again, where the coverage is high (and stay high all the way to Paris).

Figure 5A:
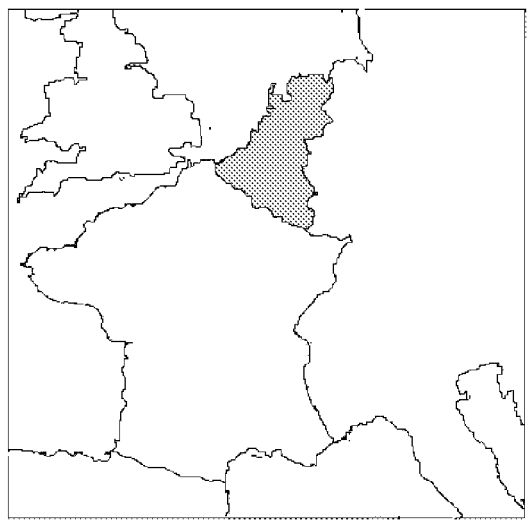
FIGS. 5a and 5b are further examples of maps showing high and low detail.
Figure 5B:
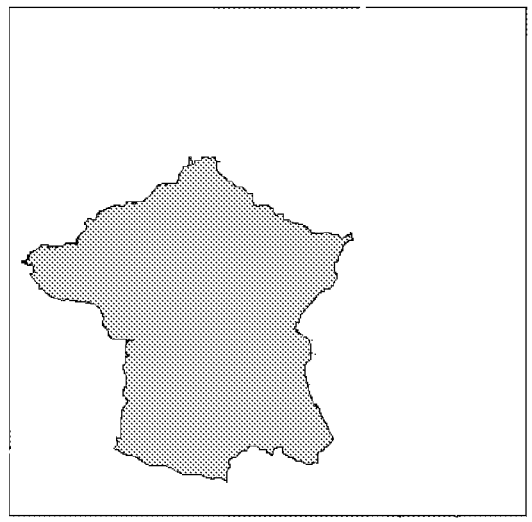

Example 2 is Illustrated in FIGS. 5a and 5b

A Normal Map Combined with Another Detailed Map

A navigation device 200 of an embodiment of the present application includes two maps stored in memory 230:
A. covering Benelux in high detail, the rest of Europe in low detail.
B. covering France in high detail.

The navigation device 200 is in Amsterdam and is displaying map A. The user of the navigation device 200 wishes to travel to an address in Paris. The user enters the name PARIS into the navigation device 200.

The processor 210 of the navigation device 200 determines that the selected city PARIS is in a relatively low-detail area of the current map, and further determines that there is also a map, covering PARIS, stored in memory 230 that has this in relatively high detail. The processor 210 of the navigation device 200 can then control display 240 to switch to display of map B.

The user of the navigation device 200 can now select an address in PARIS. The processor 210 of the navigation device 200 now plans a travel route from the current position of the navigation device 200 to the address selected/input. Route planning is done on a map covering the whole of Europe. Since the current map B does not include this, the processor 210 of the navigation device 200 can then control display 240 to switch to display to map A and can then plan a travel route on this map.

The user may now press ENTER to get to the moving map, and start driving. At a certain point, the user will leave the high-coverage area (i.e. he will leave the Benelux). Since his GPS location is of key relevance on the moving map, the processor 210 of the navigation device 200 can then control display 240 to switch to display to map B again, where the coverage is high (and stay high all the way to Paris). Note: the route that was planned on map A can be "transferred" to map B in a manner discussed below.

Figure 6A:
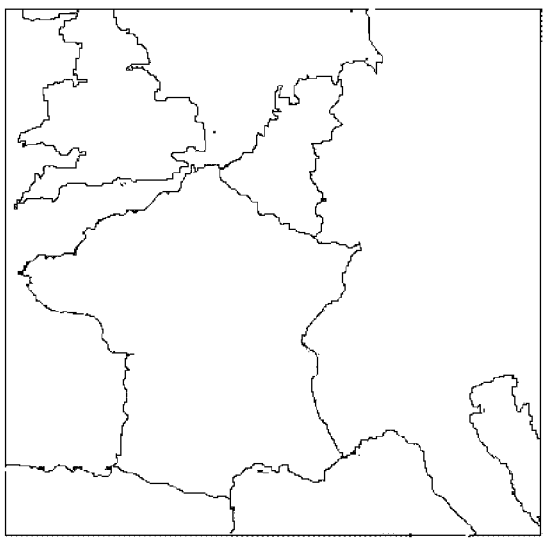
FIGS. 6a, 6b and 6c are further examples of maps showing high and low detail.
Figure 6B:
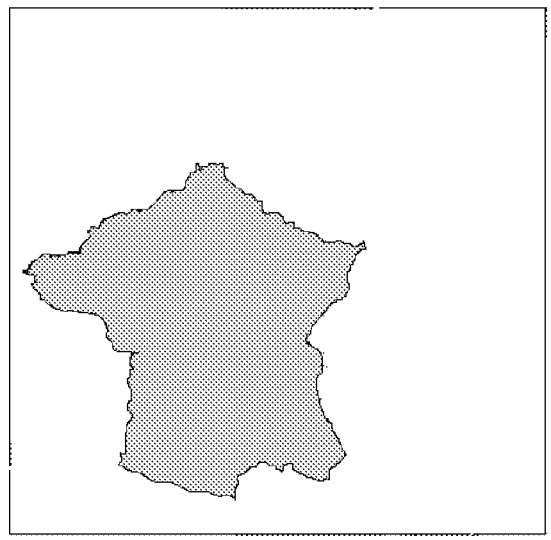
Figure 6C:
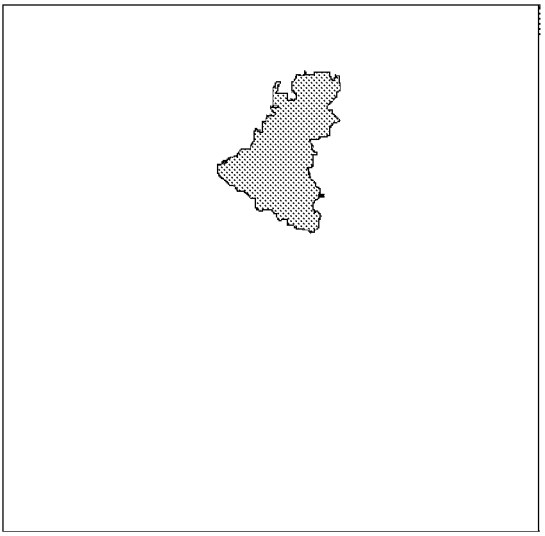

Example 3 is Illustrated in FIGS. 6a, 6b and 6c

Normal Maps Plus a Major Roads Map

A navigation device 200 of an embodiment of the present application includes three maps stored in memory 230:
A. covering Europe in low detail.
B. covering in France high detail.
C. covering Benelux in high detail.

The navigation device 200 is in Amsterdam and is displaying map A. The user of the navigation device 200 wishes to travel to an address in Paris. The user enters the name PARIS into the navigation device 200.

The processor 210 of the navigation device 200 determines that the selected city PARIS is in a relatively low-detail area of the current map, and further determines that there is also a map, covering PARIS, stored in memory 230 that has this in relatively high detail. The processor 210 of the navigation device 200 can then control display 240 to switch to display of map B.

The user of the navigation device 200 can now select an address in PARIS. The processor 210 of the navigation device 200 now plans a travel route from the current position of the navigation device 200 to the address selected/input. Route planning is done on a map covering the whole of Europe. Since the current map B does not include this, the processor 210 of the navigation device 200 can then control display 240 to switch to display to map A and can then plan a travel route on this map.

The user may now press ENTER to get to the moving map, and start driving. At a certain point, the user the processor 210 of the navigation device 200 can determine that another map C has relatively better coverage. The processor 210 of the navigation device 200 can then control display 240 to switch to display to map C which has better coverage. Note: the route that was planned on map A can be "transferred" to map C in a manner discussed below.

The user will now drive towards Paris for a while. At a certain point, the user will leave the high-coverage area (i.e. he will leave the Benelux). Since his GPS location is of key relevance on the moving map, the processor 210 of the navigation device 200 can determine to switch to map B again, where the coverage is high (and stay high all the way to Paris).

A route from map A to map B (both covering Europe) can be transferred in a number of different ways. For example, there is a route on map B, the destination point (travel destination) is on map B, and the departure point (initial position) is on map A. The below noted options provide two non-limiting examples of route transfer. Thus, these are merely examples and the embodiments of the present application are not limited to these examples.

Option 1.

Find out the last point P on the route that was planned on map B where the detail level is not relatively higher than on map A. Plan a route on map A to P. Simply put: up to point P, map A is "smarter" and thus capable of planning a route that is at least as good as what was planned on map B. From point P on, map B knows better, and at point P the processor 210 of the navigation device 200 will switch back to map B anyway.

Option 2.

Find out the last point P on the route that was planned on map B where the detail level is not higher than on map A. Also find a first point P1 on the route that has an exact equivalent on map A. Plan a route on map A to P1, then copy all nodes between P1 and P. Simply put: only re-plan a very, very small piece of the route: basically, the part between the GPS position and the route. This is only used if the GPS position is not already ON the route.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks™, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
   retrieving, from a local memory of a navigation device, map information having a first level of detail based on a current position of the navigation device;
   displaying, on a display of the navigation device, the retrieved map information including the current position of the navigation device;

repeatedly determining by a processor of the navigation device whether, for the current position of the navigation device, map information of a relatively higher level of detail than the first level of detail is stored in the local memory of the navigation device; and automatically switching the displayed map information from the first level of detail to map information of the relatively higher level of detail upon determining that the map information of the relatively higher level of detail is stored in the local memory of the navigation device.

2. The method of claim 1, further including:

storing, by the local memory of the navigation device, at least two levels of detail for an area, the at least two levels of detail being a first level of detail for the area and a relatively higher level of detail of the area.

3. The method of claim 1, wherein the displayed map information and the map information of relatively higher level of detail include at least one of traffic and road condition information.

4. A computer readable medium including program segments for, when executed on a processor of a navigation device, causing the navigation device to implement the method of claim 1.

5. The method of claim 1, further including:

determining, by the navigation device, a route of travel based upon a travel destination input into the navigation device, and wherein the displayed map information includes the current position of the navigation device and the determined route of travel.

6. The method according to claim 5, further including:

determining, by the navigation device, if the determined route of travel enters into a region for which map information of the relatively higher level of detail is available, and on, automatically switching the displayed map information from the first level of detail to the map information of the relatively higher level of detail.

7. The method of claim 1, wherein the map information of the first level of detail is included in a first map stored in the local memory and the map information of the relatively higher level of detail is included in a second map stored in the local memory.

8. A navigation device, comprising:

a receiver to receive a current position of the navigation device;

a local memory to store map information, the map information including the current position of the navigation device;

an integrated input and display device to display stored map information of a first level of detail including the current position; and a processor to repeatedly determine, for the current position of the navigation device, if map information of a relatively higher level of detail than the map information of the first level of detail is stored in the local memory, and to automatically switch the displayed map information from the first level of detail to map information of the relatively higher level of detail upon the processor determining that the map information of the relatively higher level of detail is stored in the local memory.

9. The navigation device of claim 8, wherein the local memory stores map information of at least two levels of detail for an area, the at least two levels of detail for the area being a first level of detail for the area and a second relatively higher level of detail for the area.

10. The navigation device of claim 8, wherein the displayed map information and the map information of relatively higher level of detail include at least one of traffic and road condition information.

11. The navigation device of claim 8, wherein the processor is configured to determine a route of travel based upon a travel destination input into the navigation device; and the integrated input and display device is configured to display the determined route of travel including the current position of the navigation device.

12. The navigation device of claim 11, wherein the processor is further configured to determine if the determined route of travel enters into a region for which map information of the relatively higher level of detail is available, and if so automatically switching the displayed map information from the first level of detail of the map information to the map information of the relatively higher level of detail.

13. The navigation device of claim 8, wherein the map information of the first level of detail in stored in a first map in the local memory and the map information of the relatively higher level of detail is stored in a second map in the local memory.

* * * * *